United States Patent
Saul (10) Patent No.: US 6,752,412 B2
(45) Date of Patent: Jun. 22, 2004

(54) BIASED CABLE MECHANISM FOR TRAILER HITCHES

(75) Inventor: Jonathan R. Saul, Erie, MI (US)

(73) Assignee: Shelby Industries, LLC, Shelbyville, KY (US)

(*) Notice: Subject to any disclaimer, the term of this patent is extended or adjusted under 35 U.S.C. 154(b) by 0 days.

(21) Appl. No.: 10/389,191

(22) Filed: Mar. 14, 2003

(65) Prior Publication Data

US 2003/0214115 A1 Nov. 20, 2003

Related U.S. Application Data

(63) Continuation-in-part of application No. 09/997,101, filed on Nov. 29, 2001, now Pat. No. 6,572,132.
(60) Provisional application No. 60/364,912, filed on Mar. 15, 2002.

(51) Int. Cl.[7] ................................................. B60D 1/18
(52) U.S. Cl. ..................... 280/480.1; 280/480
(58) Field of Search ............................. 280/480.1, 480, 280/491.1, 460.1, 486

(56) References Cited

U.S. PATENT DOCUMENTS

| 3,718,317 | A | 2/1973 | Hilmer |
| 3,848,895 | A | 11/1974 | Christopher |
| 4,635,953 | A | 1/1987 | Robertson et al. |
| 5,009,445 | A | 4/1991 | Williams, Jr. |
| 5,405,160 | A | 4/1995 | Weaver |
| 5,476,280 | A | 12/1995 | MacMullan |
| 5,967,539 | A | 10/1999 | Digman |
| 6,572,132 | B1 | 6/2003 | Saul |

*Primary Examiner*—Lesley D. Morris
*Assistant Examiner*—Matt Luby
(74) *Attorney, Agent, or Firm*—Harness, Dickey & Pierce, P.L.C.

(57) ABSTRACT

A biased cable mechanism is provided for enabling a secondary connection between a trailer and a vehicle. The biased cable mechanism includes a housing supporting a cable for resilient extensions from the housing. A first end of the cable is fixedly attached to the housing and a second end extends therefrom. A biasing member is operably interconnected to a mid-length of the cable enabling resilient extension of the cable from the housing for attachment to the vehicle, thereby providing the secondary connection.

23 Claims, 12 Drawing Sheets

BIASED CABLE MECHANISM FOR TRAILER HITCHES

CROSS-REFERENCE TO RELATED APPLICATIONS

This application is a continuation-in-part of U.S. patent application Ser. No. 09/997,101 filed on Nov. 29, 2001, now U.S. Pat. No. 6,572,132. This application claims the benefit of U.S. Provisional Application No. 60/364,912, filed Mar. 15, 2002. The disclosures of the above applications is are incorporated herein by reference.

FIELD OF THE INVENTION

The present invention relates to safety cables for trailer hitches and more particularly to a biased cable mechanism for trailer hitches.

BACKGROUND OF THE INVENTION

Trailers are commonly used for towing any of a number of objects including boats, snowmobiles, recreational vehicles, and the like. Trailers are conventionally coupled to a towing vehicle via a tongue and hitch interface. In general, forward extending frame rails of a trailer include a tongue fixedly attached thereto. Traditional tongues include a ball socket that interfaces with a ball of the hitch for providing a primary connection therebetween. The ball and socket interface enables a degree of independent movement of the trailer, relative to the vehicle, for turning or other movement of the trailer relative to the vehicle.

A secondary, or safety, connection is also traditionally provided by at least one chain, but preferably a pair of chains. One end of each chain is anchored to the trailer and the free ends are attached to a vehicle structure, such as a hitch portion, via a hook or some other selective attachment device. Such chain attachments, however, retain particular disadvantages. These disadvantages stem from the fact that the chains dangle between the trailer and vehicle. One disadvantage is the noise generated by the free-dangling chains contacting either the tow vehicle or the trailer. A second disadvantage is that this contact may results in damage to either the trailer or tow vehicle. A third disadvantage is that the free-dangling chains may drag on the road surface during towing, thereby damaging the chains and compromising their safety function. A final disadvantage of such free-dangling chain interconnections is the potential for the chain connection with the vehicle to become undone as a result of excessive free motion of the chain during travel.

Therefore, it is desirable in the industry to provide an improved apparatus for providing a secondary connection between a trailer and a tow vehicle. The improved apparatus should eliminate the above-described disadvantages associated with traditional secondary connection apparatuses.

SUMMARY OF THE INVENTION

Accordingly, the present invention provides a biased cable or chain mechanism for use with a trailer having a frame and a trailer hitch. The biased cable includes a housing that defines an interior and that is rigidly mounted along a length of the frame. A first cable has a first end disposed within the interior and a second end extends from the housing. A first biasing member is engaged with the first cable and the housing to enable resilient extension of the first cable from the housing.

In one feature, the first end of the first cable is fixed to the housing. A first end of the first biasing member is engaged with a mid-length of the first cable and a second end of the first biasing member is fixed to the housing.

In another feature, a second cable has a first end disposed within the interior and a second end extending from the housing. A second biasing member is engaged with the second cable and the housing to enable resilient extension of said first cable from the housing. The first end of the second cable is fixed to the housing. A first end of the second biasing member is engaged with a mid-length of the second cable and a second end of the second biasing member is fixed to the housing.

In still another feature, the housing is adapted for insertion within the frame of the trailer.

In yet another feature, the housing is adapted to be mounted along an exterior surface of said frame of said trailer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
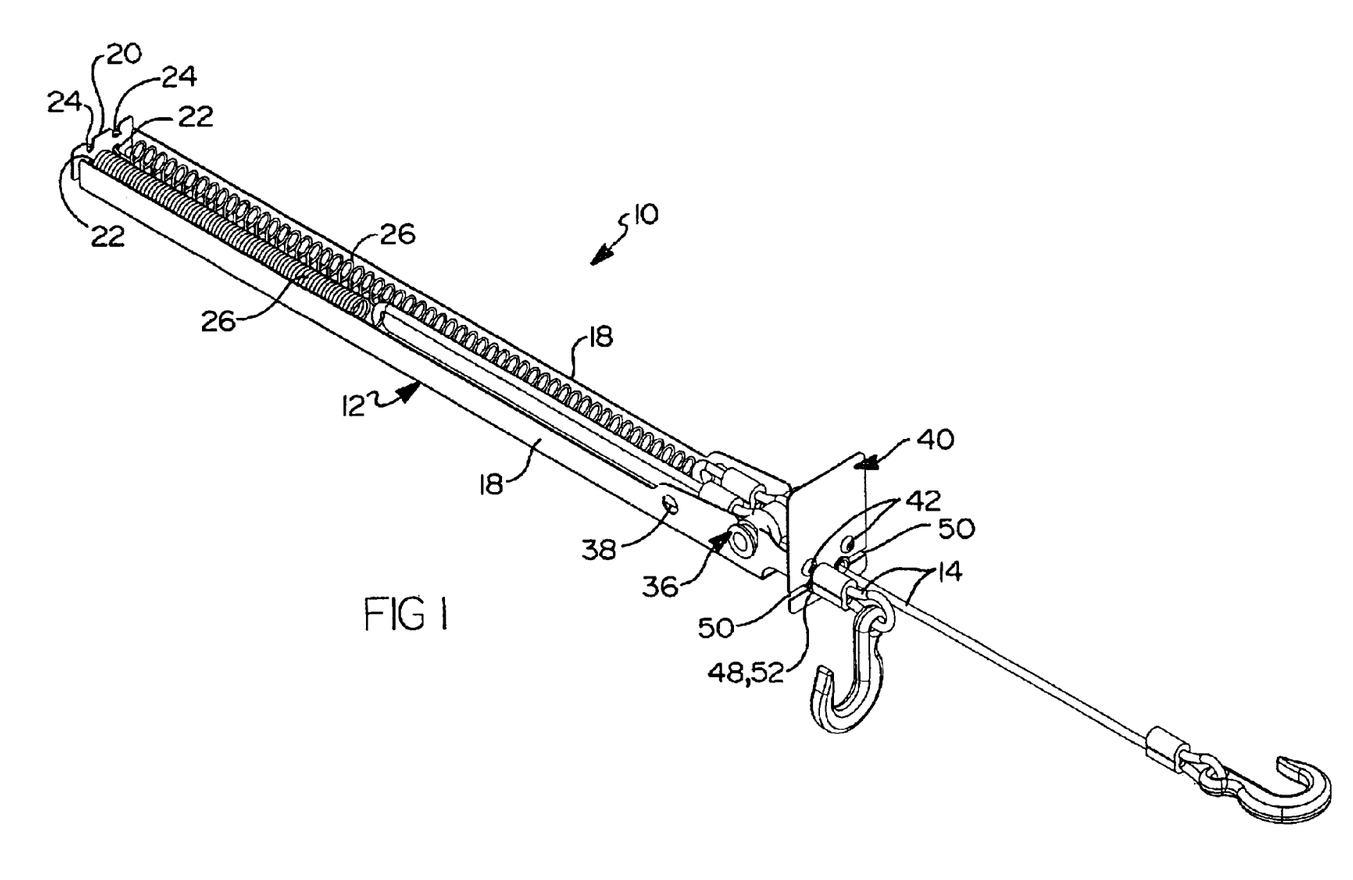
FIG. 1 is a perspective view of a biased cable mechanism in accordance with the principles of the present invention.
Figure 2:
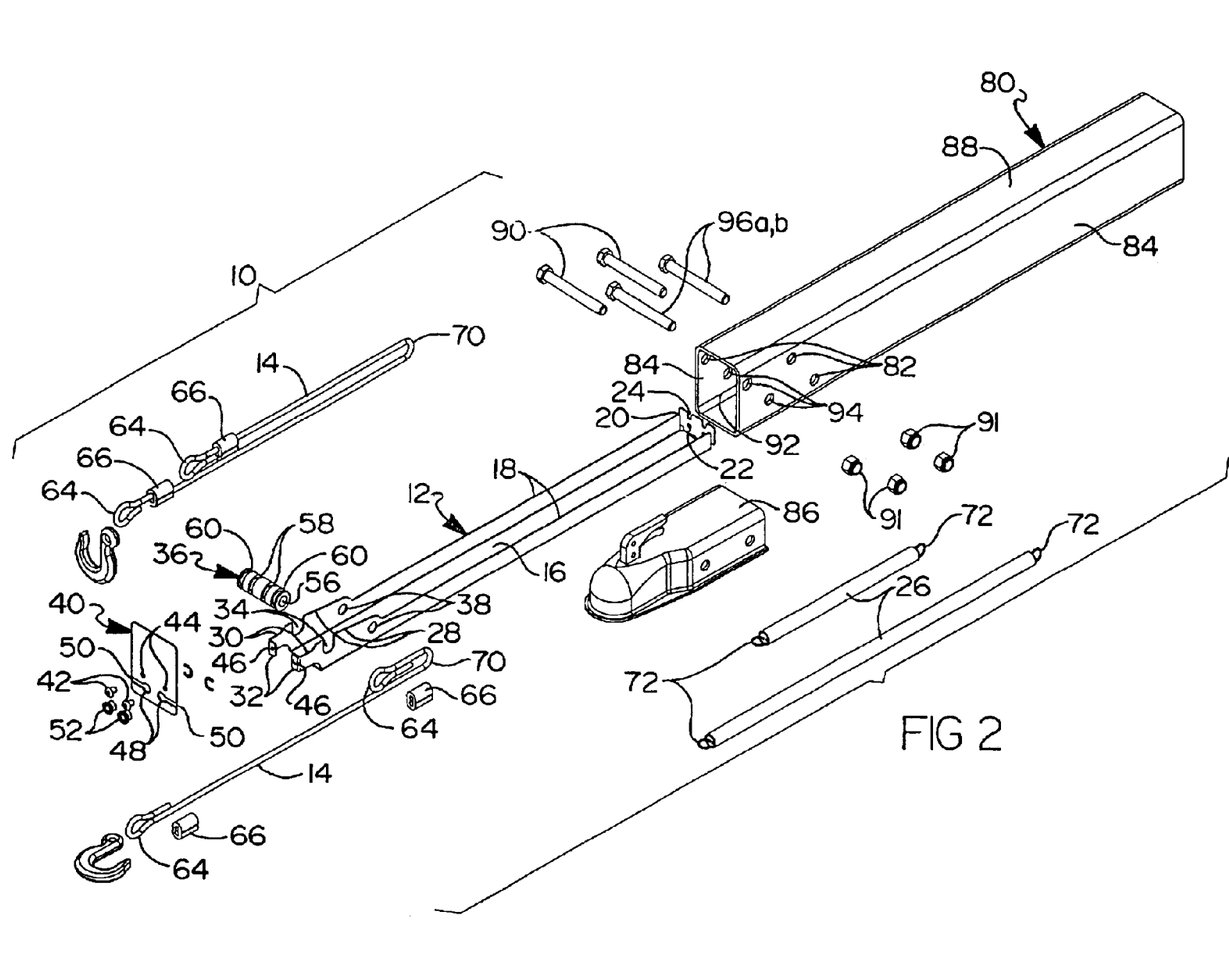
FIG. 2 is an exploded view of the biased cable mechanism of FIG. 1 as it is installed in a hollow trailer frame rail.
Figure 3:
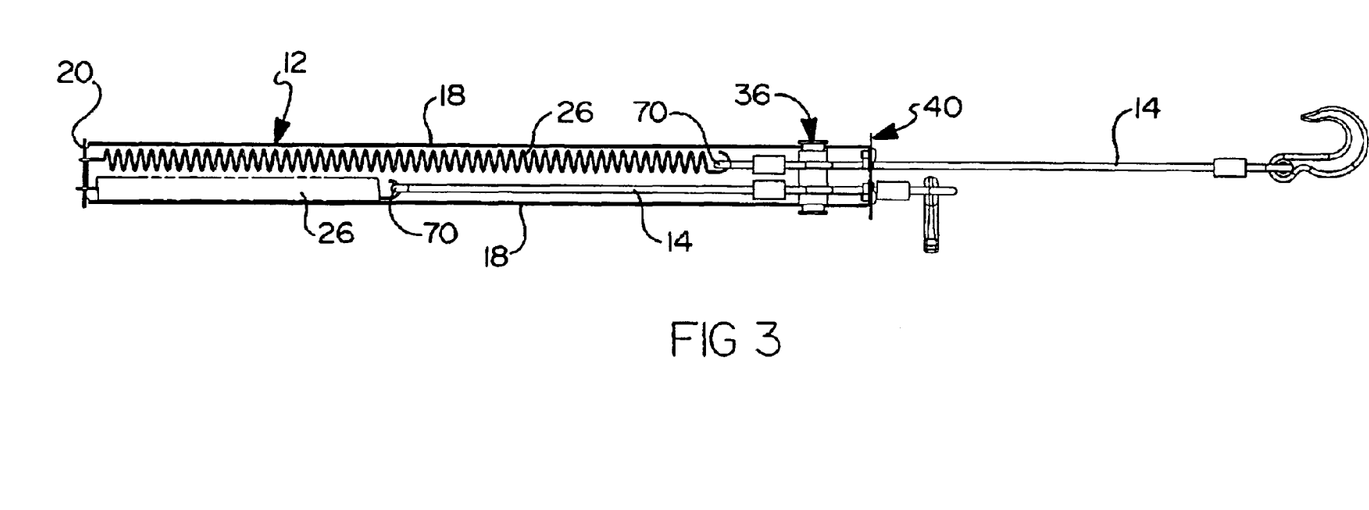
FIG. 3 is a plan view of the biased cable mechanism of FIG. 1.
Figure 4:
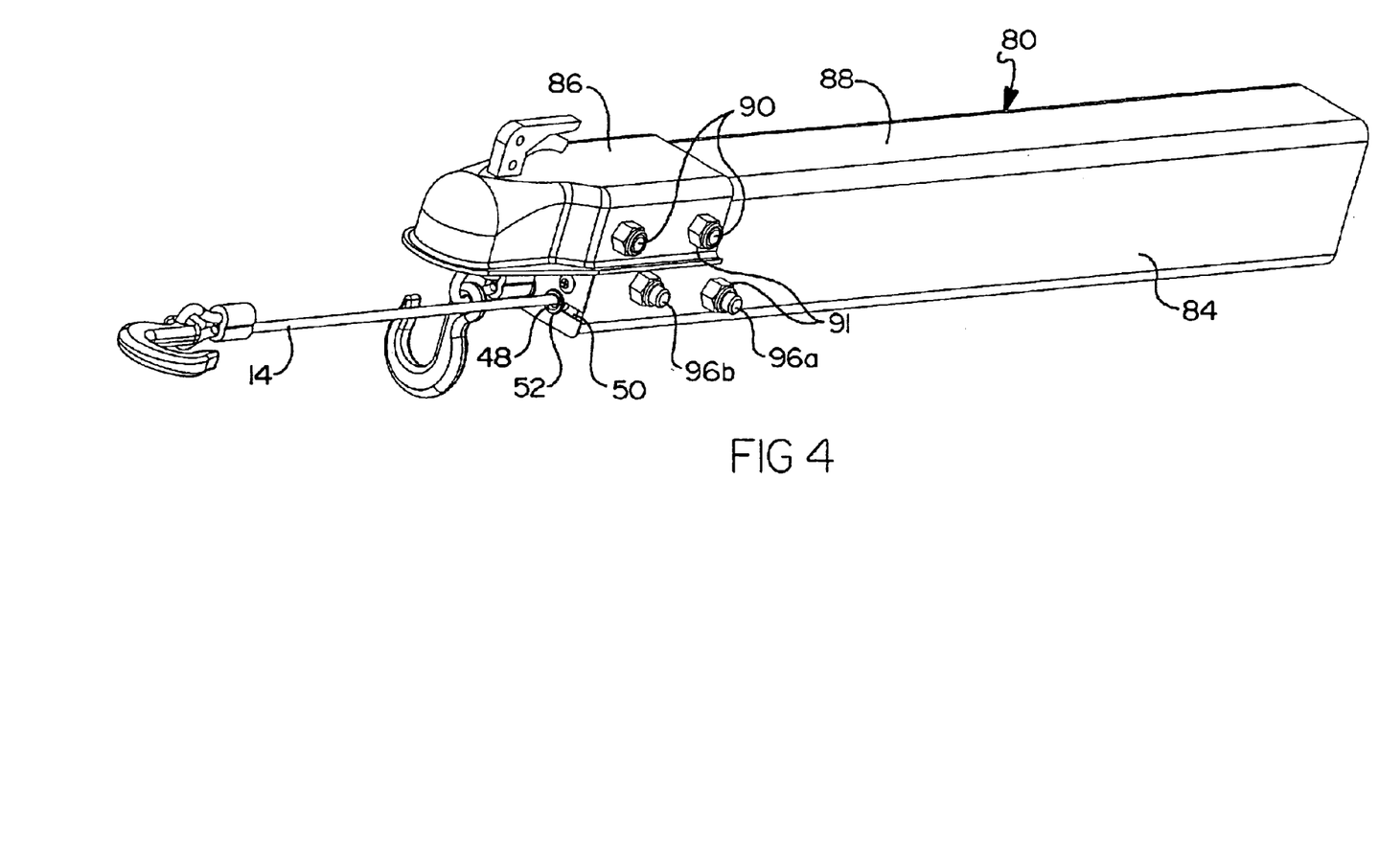
FIG. 4 is a perspective view of a hollow frame length of a trailer incorporating the biased cable mechanism therein.

With particular reference to FIGS. 1 through 3, the present invention includes a biased cable mechanism 10 for providing a secondary (or safety) connection between trailers and their respective tow vehicle. The biased cable mechanism 10 includes a housing 12 resiliently supporting a pair of cables 14. The cables 14 resiliently extend from the housing 12 for attachment to a tow vehicle's hitch or bumper structure (not shown) for providing the secondary connection.

The housing 12 includes a central length having a longitudinal base plate 16 with upward extending side plates 18. A back or rearward end of the housing 12 includes an upward extending end plate 20. The end plate 20 includes a pair of apertures 22 and recesses 24 for attachment of a biasing member 26, as described in further detail hereinbelow. The side plates 18 each include upward extending support structures 28 formed at a front end of the housing 12. The support structures 28 include forward extending arms 30, generally having an L-shape, for providing a front mounting surface 32. Further, the support structures 28 each include a recess 34 for receiving a cross-member 36 therein, as described in further detail hereinbelow. Each support structure 28 also includes an aperture 38 therethrough for facilitating assembly, as discussed hereinbelow.

The housing 12 also includes a face plate 40 fixedly attached to the front mounting surfaces 32 of the support structures 28. The face plate 40 may be fixed to the front mounting surfaces 32 by any one of a number of methods commonly known in the art, such as welding or the like. However, the face plate 40 is preferably attached using threaded fasteners 42. The face plate 40 includes centrally disposed apertures 44 for receiving fasteners 42 therethrough for alignment and interface with corresponding apertures 46 located on the front mounting surfaces 32. The face plate 40 also includes keyed apertures 48, through which the cables 14 extend. Keyways 50 of the keyed apertures 48 enable passage of the cables 14 therethrough, for aiding in assembly of the biased cable mechanism 10. A pair of bushings 52 are provided and seat within the keyed apertures 48 for providing a protective interface between the cables 14 and the keyed apertures 48.

In the interest of reduced complexity and production efficiency, the housing 12 is preferably constructed from a single piece of stamped sheet metal that is formed to provide the various portions described hereinabove. It is anticipated, however, that the housing 12 may be formed of individual portions that are fixed together by welding, bolting, or the like.

The cross-member 36 is provided for anchoring the cables 14 through the housing 12 to the housing frame length in which the housing 12 is located. The cross-member 36 is preferably cylindrical in shape having a central cavity 56, a pair of central grooves 58 and a pair of distal grooves 60. The distal grooves 60 enable location of the cross-member 36 in the housing 12. More specifically, the cross-member 36 is disposed between the support structures 28 of the housing 12, whereby it is received into the recesses 34 thereof. Edges of the recesses 34 slide into engagement with the distal grooves 60 of the cross-member 36. As discussed in further detail above, the central grooves 58 enable improved connection of the cables 14 to the cross-member 36. Although not detailed in the Figures, it is contemplated that the cross-member 36 may be provided in two parts, each part separately securing a respective cable 14 via the housing 12 to the hollow trailer frame rail. In this manner, the cables 14 are individually secured, whereby a potential failure in attachment of one of the cables 14 does not result in failure of both.

The term cables is meant to include various types of similar structures known in the art including ropes, chains and the like. The cables 14 of the present embodiment are preferably formed of a length of multi-braid, coated cable having loops 64 formed at either end. The loops 64 are formed by folding each end of the cable back along its length and crimping, using crimps 66. One end of each cable 14 is attached to the cross-member 14, whereby the cross-member 36 is received through the loop 64. The central grooves 58 of the cross-member 36 align with the loops 64 enabling the loops 64 to seat therein. The cables 14 run backward from the cross-member 36 along a portion of the length of the housing 12 before looping back to run forward through the housing 12 and extend outward through the keyed apertures 48 of the face plate 40. The looping back of the cable 14 generally forms an arcuate loop portion 70.

The biasing members 26 resiliently interconnect the cables 14 and the housing 12. Specifically, a first end of each biasing member 26 is a respective aperture and recess pair 22,24 of the end plate 20. The biasing members 26 and extend forwardly through the housing 12 for operable attachment at their second ends with the arcuate loop portions 70 of the cables 14. Operable interconnection of the biasing members 26 and the cables 14 results in drawing action of the flowing arcuate loop portion 70 through the engagement point of the respective biasing member 26, when the free end of the cable 14 is pulled forward, because the biasing member 26 imparts a pulling or retraction force on the cable 16 to counteract the forward pulling force. In this manner, the cable 14, as it extends from the housing 12, is consistently taut. (See FIG. 3). In the embodiment shown, the biasing members 26 are provided as stainless steel coil springs having looped attachment ends 72 for interconnection with the end plate 20 and the cables 14. It is anticipated, however, that the biasing members 26 may alternatively be provided as resilient bodies made from elastic rubber or other material commonly known in the art and having similar elastic or resilient properties.

The biasing member preferably includes a manageable spring rate for enabling a person to pull the cables 16 forward for attachment to the tow vehicle while being sufficient enough to maintain the cables 16 taught during operation, or fully retracted during non-use of the trailer. A preferred spring rate range is 1 to 3 lbs of pulling force per inch of extension.

Implementation and operation of the biased cable mechanism 10 will be described in detail with respect to FIGS. 1, 2, 4 and 5. As mentioned above, the biased cable mechanism 10 of the present invention is preferably designed for implementation with towed trailers for providing secondary (safety) connections. A portion of a trailer is shown including a hollow, central frame rail 80. The central frame rail 80 extends forward and includes a plurality of apertures 82 disposed through an upper portion of a pair of side walls 84. A tongue mechanism 86 is bolted to a top surface 88 of the central frame rail 80 via a plurality of bolts 90 received through the plurality of apertures 82 and fixed with corresponding nuts 91. The tongue mechanism 86 is preferably of a type commonly known in the art, therefore a detailed description will not be presented here.

The biased cable mechanism 10 is disposed within a cavity 92 of the central frame rail 80 with the face plate 40 resting flush against an end of the central frame rail 40. A plurality of apertures 94 are disposed through a lower portion of the side walls 84, below the apertures 82, for securing the biased cable mechanism 10 within the cavity 92. A corresponding pair of bolts 96a,b are received therethrough with a first bolt 96a being received through the apertures 38 of the support structures 28 and a second bolt 96b is received through the cross-member 36. The bolts 96a,b secure the cables 14 directly to the central frame rail 40. In this manner, a direct connection between the tow vehicle and the central frame rail 40 is provided for ensuring the integrity of the safety function.

Figure 5:
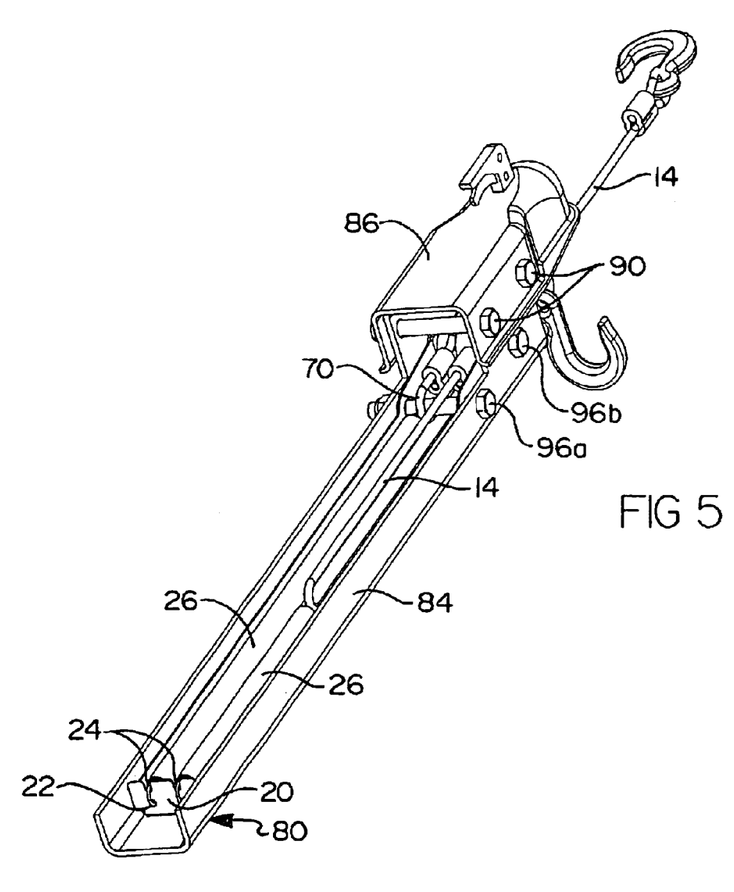
FIG. 5 is an alternative perspective view of the hollow frame length of FIG. 6 having a cut-away portion.

As best seen in FIG. 5, the first bolt 96a defines a bottom-out or limit point of cable extension when the loop portion 70 of the cable 14 contacts the first bolt 96a. By securing the biased cable mechanism 10 within the central frame rail 80, the biased cable mechanism 10 is hidden from view with only the cables 14 extending therefrom. The trailer is hitched to a tow vehicle (not shown) by way of coupling the tongue 86 to a hitch (not shown) extending from the tow vehicle. The cables 14 of the biased cable mechanism 10 extend forward for attachment typically to a portion of the tow vehicle's hitch via the hooks.

Figure 6:
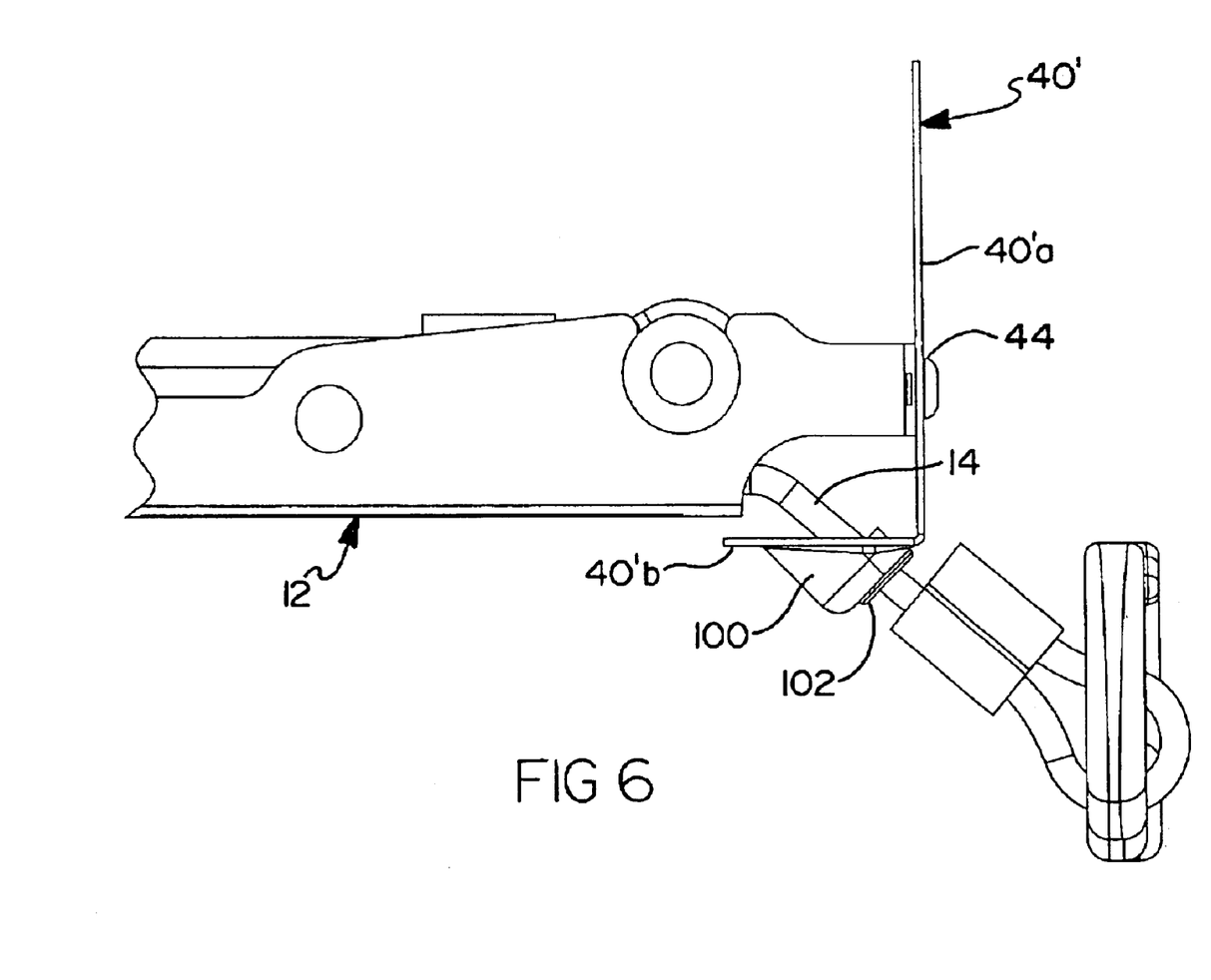
FIG. 6 is a side view of the biased cable mechanism including an alternative face plate.
Figure 7:
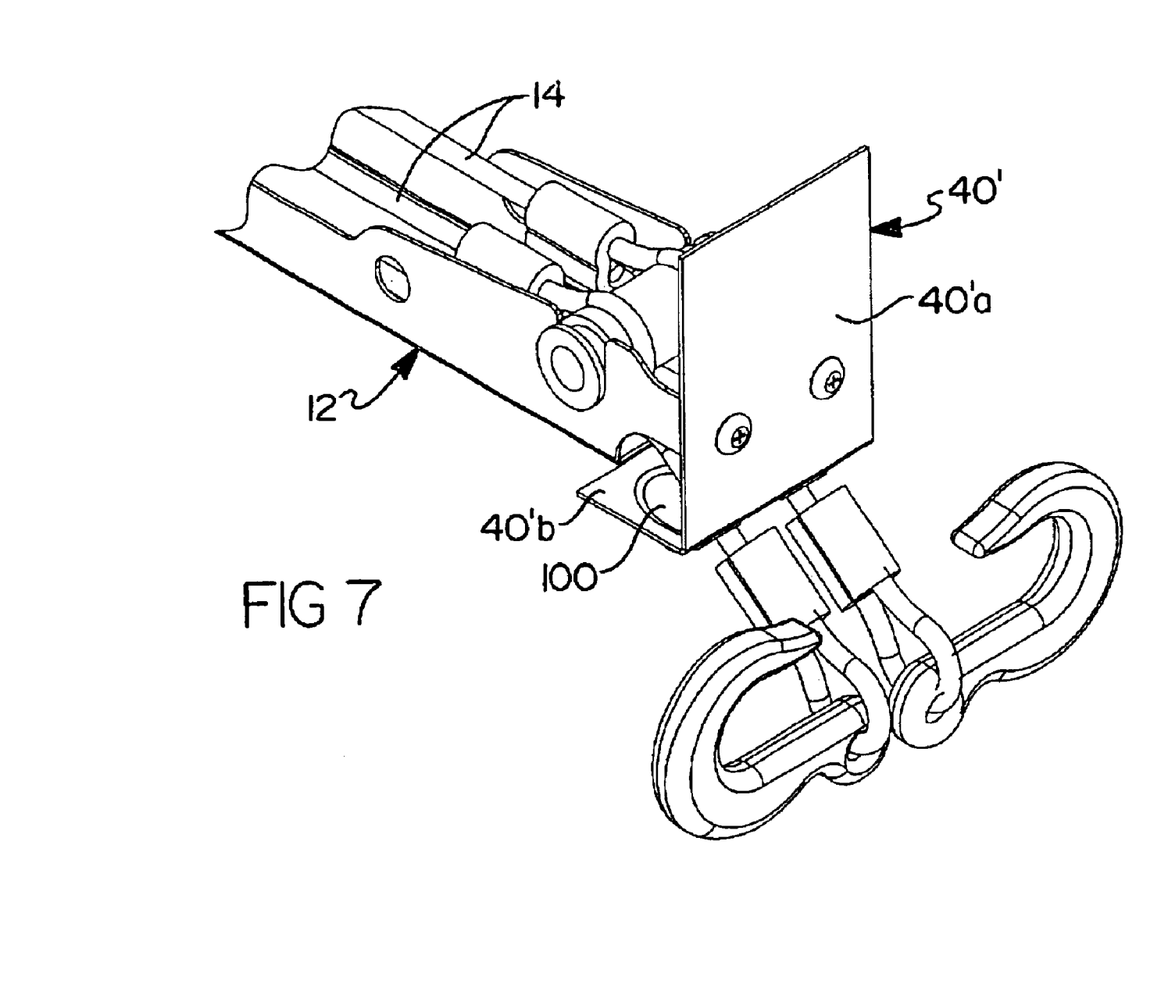
FIG. 7 is a perspective view of the biased cable mechanism of FIG. 6.

With particular reference to FIGS. 6 and 7, an alternative face plate 40' is provided. The face plate 40' is generally L-shaped having an upper length 40a' and a lower length 40b'. The upper length 40a' includes apertures 44' for fastening the face plate 40' to the housing 12. The lower length 40b' includes a pair of protrusions 100 each having an aperture 102 therethrough. In accordance with implementation of the face plate 40', the cables 14 extend through the apertures 102, generally downward relative to the housing 12. In this manner, the cables 14 can be initially directed away from the tongue 86 to avoid interference therewith.

Figure 8:
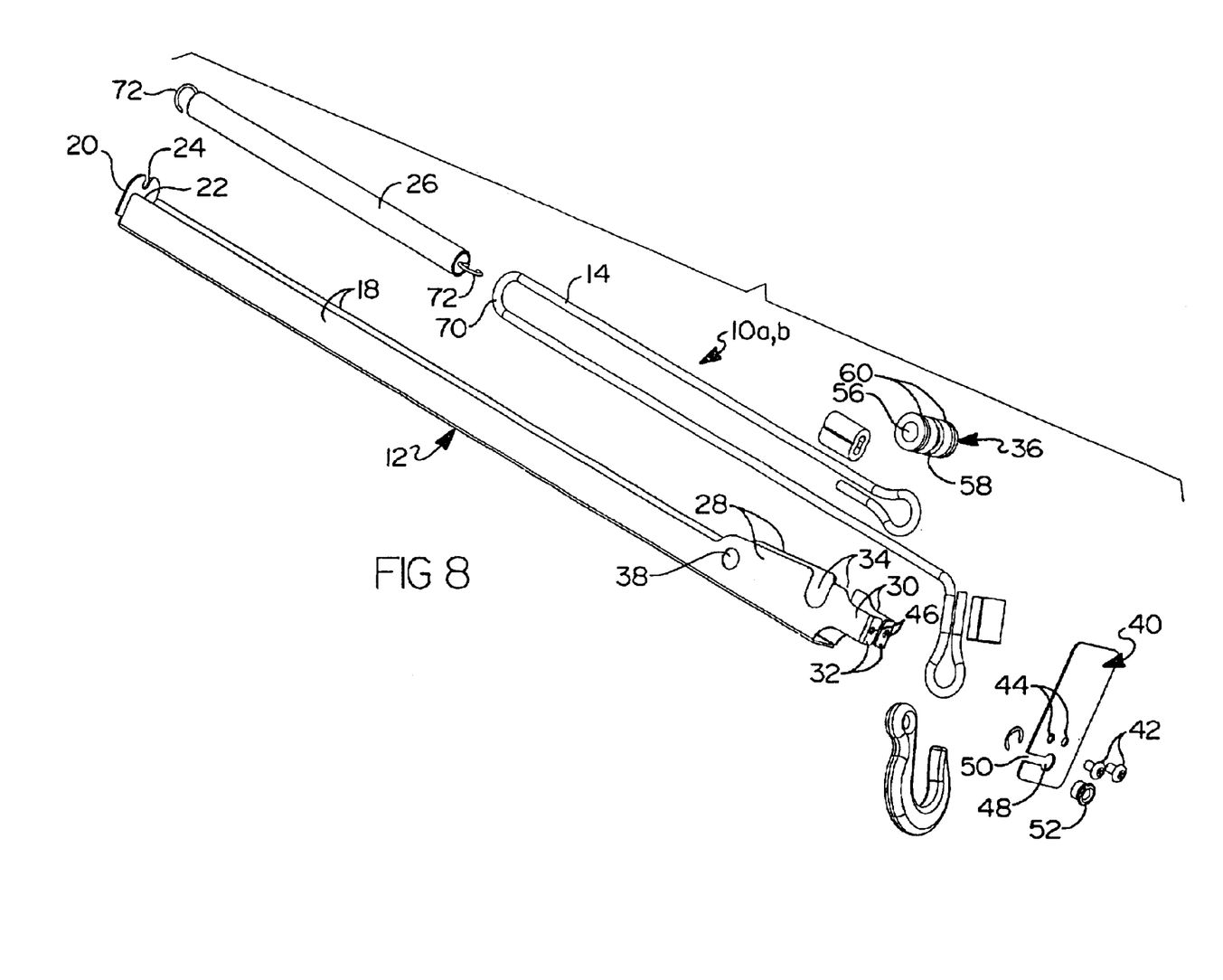
FIG. 8 is an exploded view of an alternative embodiment of the biased cable mechanism of the present invention.

With particular reference to FIG. 8, an alternative embodiment of a biased cable mechanism 10 is shown. The biased cable mechanism 10 of FIG. 8 generally includes like components as those described above, therefore, the same reference numerals will be used to indicate the like components. Essentially, the biased cable mechanism 10 includes two identical halves 10a, 10b, each half 10a, 10b being of a similar construction to the biased cable mechanism 10 described above, but having only a single cable 14 extending therefrom. Because both halves 10a, 10b of the biased cable mechanism 10 are identical only one will be described in detail.

The biased cable mechanism half 10a includes a housing 12 resiliently supporting the cable 14. The housing 12 includes a central length having a longitudinal base plate 16 with upward extending side plates 18. A rearward end of the housing includes an upward extending end plate 20. The end plate 20 includes an aperture 22 and a recess 24 for attachment of one end of a biasing member 26, as described in further detail hereinbelow. The side plates 18 each include upward extending support structures 28 formed at a front end of the housing 12. The support structures 28 include forward extending arms 30, generally having an L-shape, for providing a front mounting surface 32. Further, the support structures 28 each include a recess 34 for receiving a cross-member 36 therein, as described in further detail hereinbelow. Each support structure 28 also includes an aperture 38 therethrough for facilitating assembly, as discussed hereinbelow.

The housing 12 also includes a face plate 40 fixedly attached to the front mounting surfaces 32 of the support structures 28. The face plate 40 may be fixed to the front mounting surfaces 32 by any one of a number of methods commonly known in the art, such as welding and the like. However, they are preferably attached using threaded fasteners 42. The face plate 40 includes centrally disposed apertures 44 for receiving the fasteners 42 therethrough for alignment and interface with corresponding apertures 46 of the front mounting surfaces 32. The face plate 40 also includes a keyed aperture 48, through which the cable 14 extends. A keyway 50 of the keyed aperture 48 enables passage of the cable 14 therethrough, aiding in assembly. A bushing 52 is provided and seats within the keyed aperture 48 for providing a protective interface between the cable 14 and the keyed aperture 48.

The cross-member 36 is provided for anchoring the cable 14 through the housing 12 to the hollow frame length in which the housing 12 is located. The cross-member 36 is preferably cylindrical in shape including a central cavity 56, a central groove 58 and a pair of distal grooves 60. The distal grooves 60 enable location of the cross-member 36 in the housing 12. More specifically, the cross-member 36 is disposed between the support structures 28 of the housing 12, whereby it is received into the recesses 34 thereof. Edges of the recesses 34 slide into engagement with the distal grooves 60 of the cross-member 36. As discussed in further detail above, the central groove 58 enables improved connection of the cable 14 to the cross-member 36.

The biasing member 26 resiliently interconnects the cable 14 and the housing 12. Specifically, a first end of the biasing member 26 is attached to the aperture and recess pair 22,24 of the end plate 20. The biasing member extends forwardly through the housing 12 for operable attachment at its second end with the arcuate loop portion 70 of the cable 14. Operable interconnection of the biasing member 26 and the cable 14 results in a drawing action of the flowing arcuate loop portion 70 through the second end engagement point of the biasing member 26 when the free end of the cable 14 is pulled forward because the biasing member 26 imparts a pulling or retraction force on the cable 14 to counteract the forward pulling force. In this manner, the cable 14, as it extends from the housing 12, is consistently taut. In the embodiment shown, the biasing member 26 is provided as a stainless steel coil spring having looped attachment ends 72 for interconnection with the end plate 20 and the cables 14. It is anticipated, however, that the biasing member 26 may alternatively be provided as a resilient body made from elastic rubber or other material commonly known in the art and having similar elastic or resilient properties.

Figure 9:
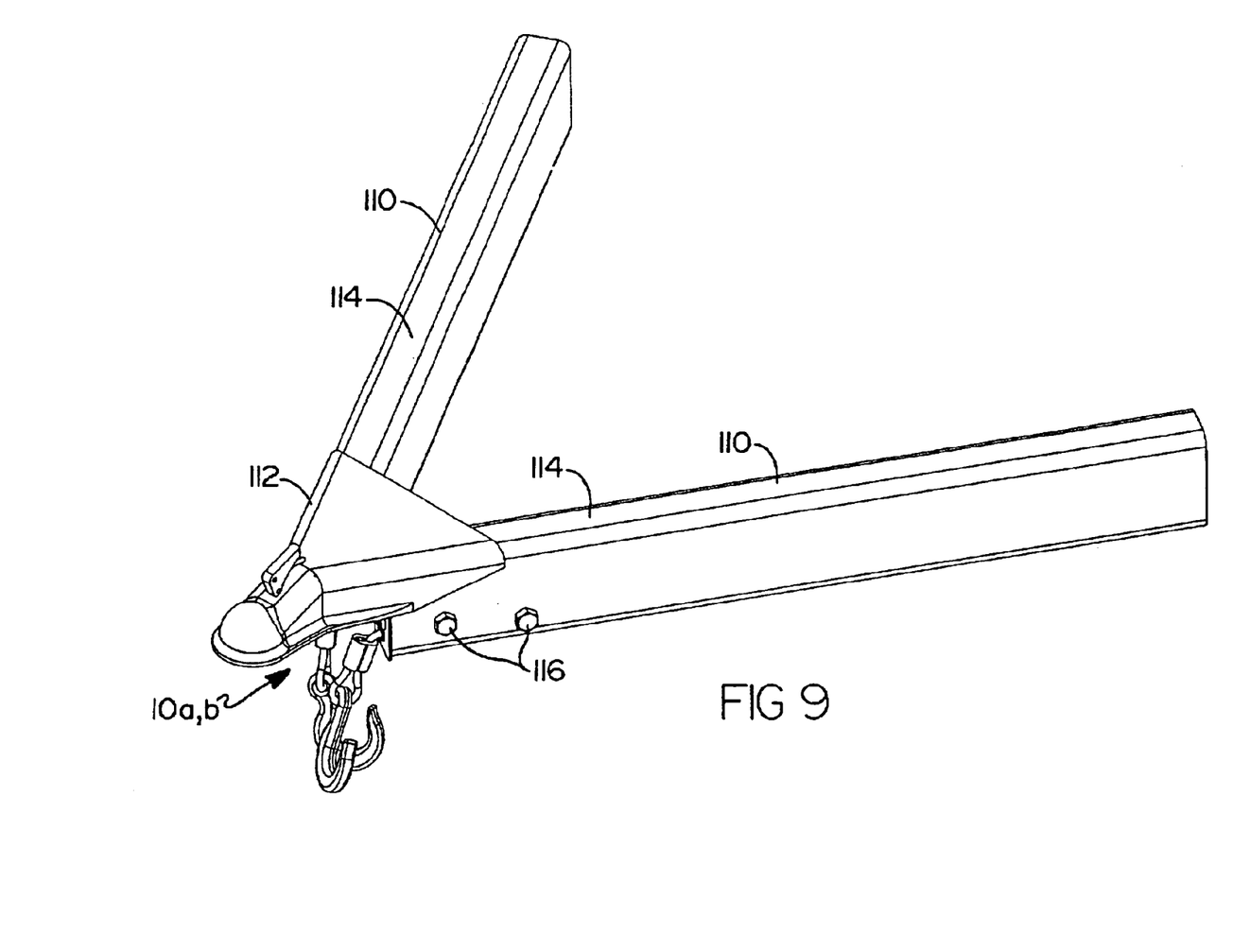
FIG. 9 is a perspective view of a pair of hollow frame lengths of a trailer incorporating the alternative embodiment of the biased cable mechanism for attachment to a vehicle.

The two-halved biased cable mechanism 10 is preferably implemented with the type of trailer detailed in FIG. 9. The trailer of FIG. 9 includes a pair of hollow frame rails 110 that form a V-shaped frame at the front of the trailer. A tongue 112 is fixed to a top surface 114 of the frame rails 110. Similarly, as described above, bolts 116 are received through the frame rails 110 for securing the individual biased cable mechanism halves 10a, 10b within the frame rails 110. One bolt is received through the apertures 38 of the support structure 28, acting as a bottom-out point for the respective cable 14, and the other is received through the cavity 56 of the cross-member 36. The bolts secure the cable 14 directly to the frame rail 110. In this manner, a direct connection between the tow vehicle and the frame rail 110 is provided for ensuring the integrity of the safety function.

Figure 10:
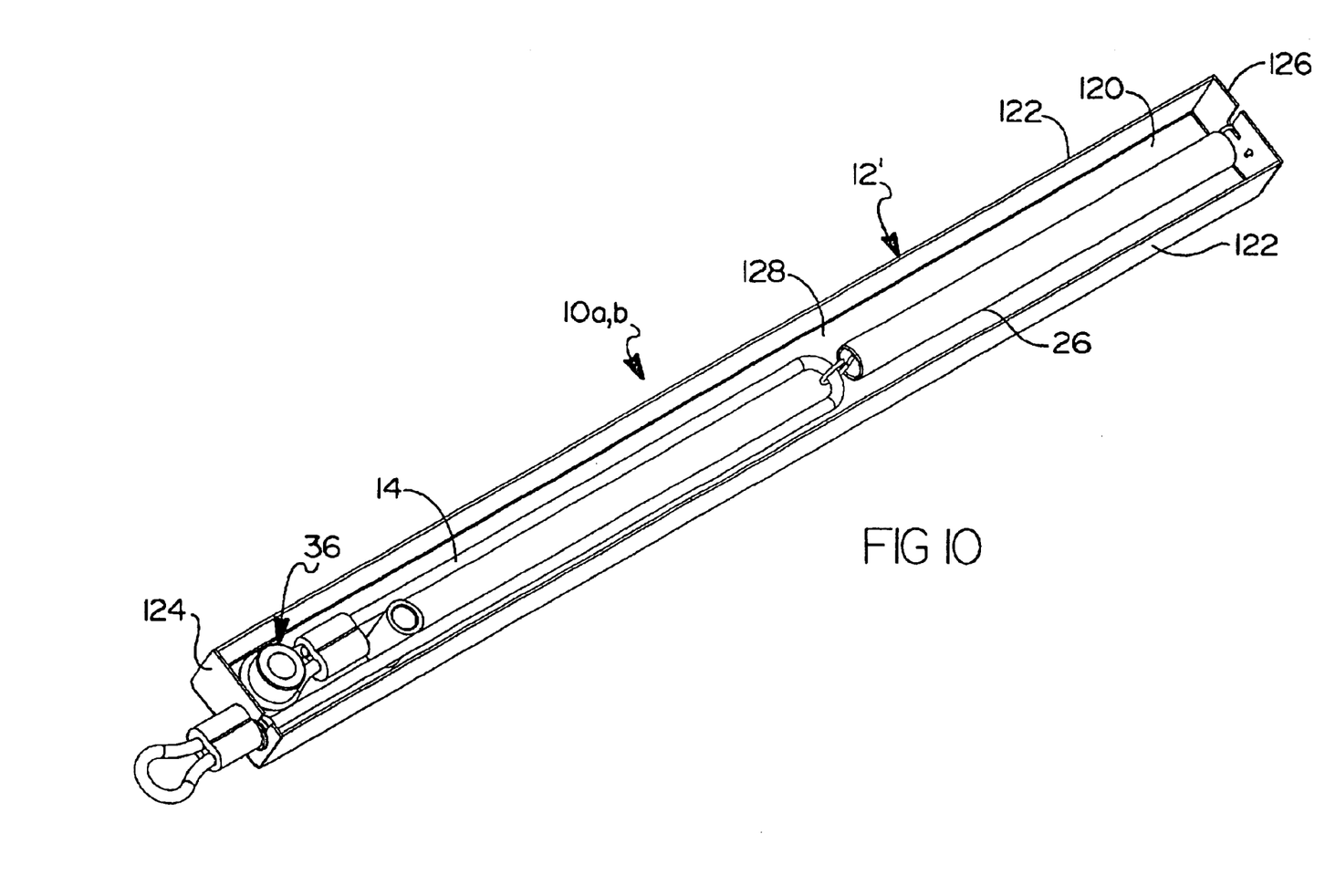
FIG. 10 is a second alternative embodiment of the biased cable mechanism of the present invention.

With respect to FIG. 10, an alternative embodiment of the biased cable mechanism of FIG. 8 will be described in detail. The modified embodiment of FIG. 10 includes like components to that of FIG. 8, therefore, like reference numbers will be used. An alternative housing 12' is provided and is generally box-shaped having a bottom 120, a top and bottom 122, a front end 124 and a back end 126, forming an open cavity 128. The housing 12' retains the similar components of the biased cable mechanism 10 as described for the other embodiments. The cable 14, biasing member 26 and cross-member 36 are each disposed within the housing 12' and function as described in detail above.

Figure 11:
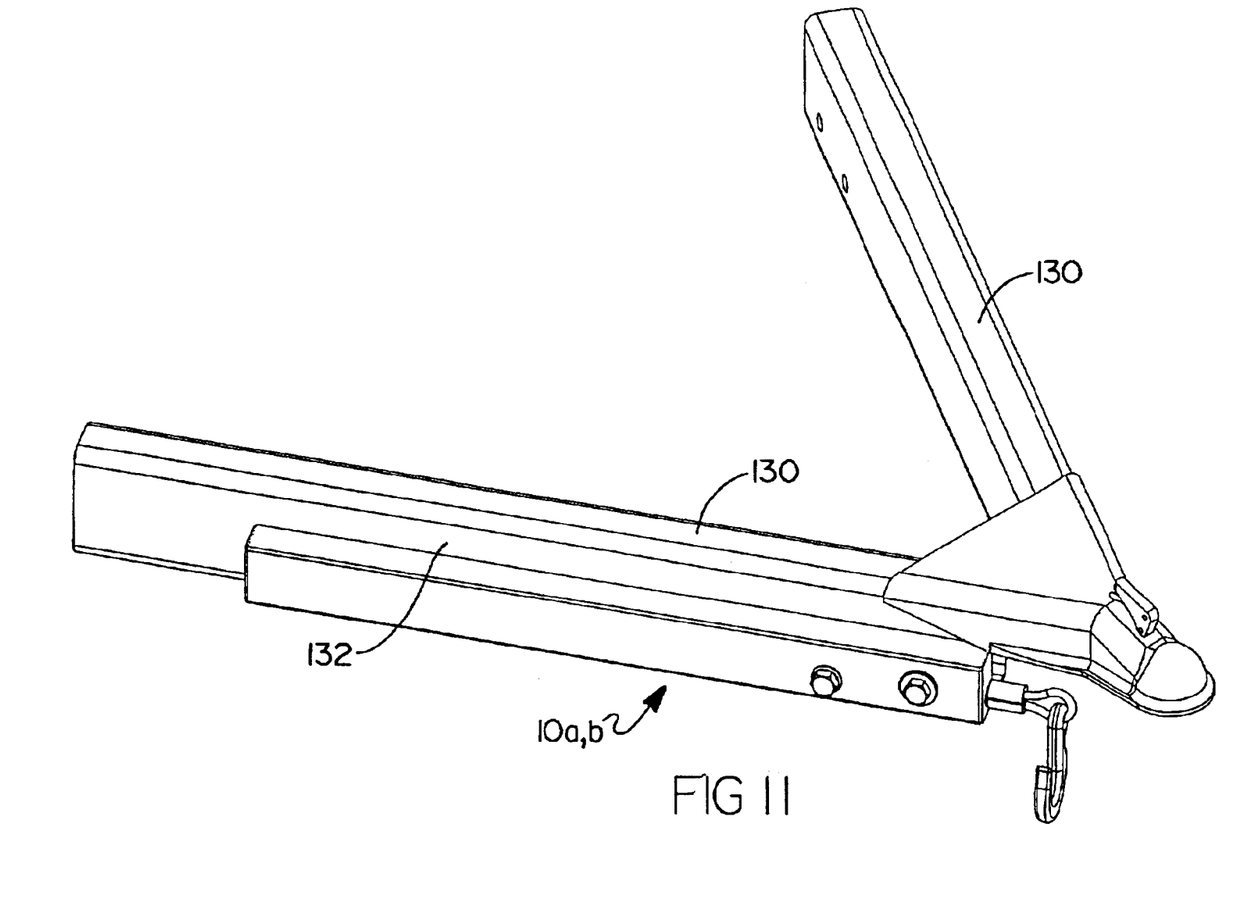
FIG. 11 is a perspective view of a portion of a trailer incorporating the biased cable mechanism of FIG. 10.

As best seen in FIG. 11, the modified embodiment of the biased cable mechanism 10 is selectively mountable to the exterior of a frame rail 130 of a trailer. The biased mechanism 10 is mounted against a face 132 of the frame rail 130, thereby enclosing the cavity 128 of the housing 12'. In this manner, each component of the biased cable mechanism 10 is covered and protected from the external environment and any other interference issues such as brake lines or wires running through the frame rail 130. In addition, some trailer frames comprise I-beam or C-beam construction instead of a hollow tubular construction. This embodiment enables quick modification of a trailer for implementation of the biased cable mechanism 10.

Figure 12:
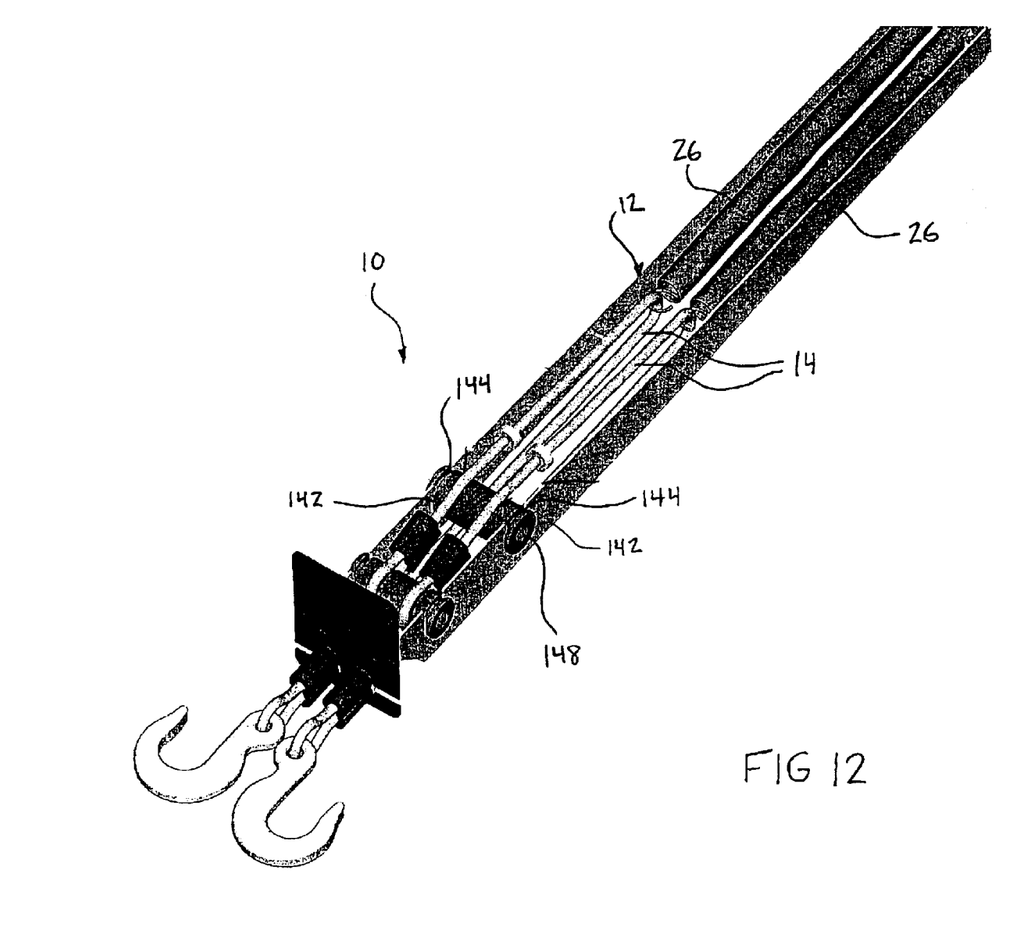
FIG. 12 is a perspective view of a third alternative embodiment of the biased cable mechanism of the present invention.

With reference to FIG. 12, an alternative embodiment of the biased cable mechanism 10 is provided. It will be appreciated that the components of the alternative embodiment of FIG. 12 are similar to those previously described and thus, like reference numerals are used. The alternative embodiment of FIG. 12 is essentially of similar construction to that of the embodiment of FIG. 1, however, a second cross-member 140 is provided and is of the same construction as that described herein for the cross-member 36. Therefore, a detailed description of the second cross-member 140 is foregone.

Similar to the cross-member 36, the second cross-member 140 is retained on the housing 12, whereby edges of recesses 142 formed in the housing 12 are received into distal grooves 144 of the second cross-member 140. The cables 14 run over the second cross-member 140 toward the springs 26 and back around, as described in detail above. In assembly, the second bolt 96b is received through a bore 148 of the second cross-member 140, for securing the biased cable mechanism 10 within the central frame rail 80 in a manner discussed in detail herein.

The second cross-member 140 provides a larger circumferential surface, about which the cables 14 wrap in a fully extended state, as compared to a circumferential surface of the second bolt 96b. A smaller circumferential surface has a potentially detrimental effect on the integrity of the cables 14, whereby the cables 14 may be caused to pinch, kink, twist, fray or otherwise manipulated in an undesired manner. The larger circumferential surface of the second cross-member 140 ensures uniformity of the bending radius of the cables 14 as each winds about the second cross-member 140 in the fully extended state. Another advantage of the second cross-member 140 is improved pull-strength of the biased cable mechanism 10 as a whole. More particularly, in the fully extended state, the pulling force is transferred through the cables 14 and applied to the biased cable mechanism 10 through the second cross-member 140, as opposed to directly through the second bolt 96b. The second cross-member 140, having a larger diameter and mounting area through the recesses 142 than the second bolt 96b, has improved loading capacity, thereby improving the overall pull-strength of the biased cable mechanism 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A biased cable mechanism for use with a trailer having a frame and a trailer hitch, comprising:
    a housing that defines an interior and that is rigidly mounted along a length of said frame;
    a first cable having a first end disposed within said interior and a second end extending from said housing; and
    a first biasing member engaged with said first cable and said housing to enable resilient extension of said first cable from said housing.

2. The biased cable mechanism of claim 1, wherein said first end of said first cable is fixed to said housing and wherein a first end of said first biasing member is engaged with a mid-length of said first cable and a second end of said first biasing member is fixed to said housing.

3. The biased cable mechanism of claim 1, further comprising:
    a second cable having a first end disposed within said interior and a second end extending from said housing; and
    a second biasing member engaged with said second cable and said housing to enable resilient extension of said first cable from said housing.

4. The biased cable mechanism of claim 3, wherein said first end of said second cable is fixed to said housing and wherein a first end of said second biasing member is engaged with a mid-length of said second cable and a second end of said second biasing member is fixed to said housing.

5. The biased cable mechanism of claim 1, wherein said first biasing member is a spring.

6. The biased cable mechanism of claim 1, wherein said first biasing member is a resilient band.

7. The biased cable mechanism of claim 3, wherein said second biasing member is a spring.

8. The biased cable mechanism of claim 3, wherein said second biasing member is a resilient band.

9. The biased cable mechanism of claim 1, wherein said housing is adapted for insertion within said frame of said trailer.

10. The biased cable mechanism of claim 1, wherein said housing is adapted to be mounted along an exterior surface of said frame of said trailer.

11. The biased cable mechanism of claim 1, further comprising a hook attached to said second end of said first cable for selectively attaching said first cable to a vehicle to which said trailer may be hitched for towing.

12. The biased cable mechanism of claim 3, further comprising a hook attached to said second end of said second cable for selectively attaching said second cable to a vehicle to which said trailer may be hitched for towing.

13. A biased cable mechanism for use with a trailer having a frame and a trailer hitch, comprising:
    a housing having a support cross-member disposed therein;
    a first cable having a first end fixed to said housing and a second end extending from said housing, said first cable wound about said support cross-member; and
    a first biasing member having a first end operably engaged with a mid-length of said first cable and a second end fixed to said housing for enabling resilient extension of said first cable from said housing, wherein extension of said first cable is limited by said support cross-member.

14. The biased cable mechanism of claim 13, further comprising an anchor cross-member disposed within said housing, wherein said first end of said first cable is fixed to said anchor cross-member.

15. The biased cable mechanism of claim 13, further comprising:
    a second cable having a first end fixed to said housing and a second end extending from said housing, said second cable wound about said support cross-member; and
    a second biasing member having a first end operably engaged with a mid-length of said second cable and a second end fixed to said housing for enabling resilient extension of said second cable from said housing, wherein extension of said second cable is limited by said support cross-member.

16. The biased cable mechanism of claim 13, wherein said first biasing member is a spring.

17. The biased cable mechanism of claim 1, wherein said first biasing member is a resilient band.

18. The biased cable mechanism of claim 15, wherein said second biasing member is a spring.

19. The biased cable mechanism of claim 15, wherein said second biasing member is a resilient band.

20. The biased cable mechanism of claim 13, wherein said housing is adapted for insertion within the frame of the trailer.

21. The biased cable mechanism of claim 13, wherein said hosing is adapted to be mounted along an exterior surface of said frame of said trailer.

22. The biased cable mechanism of claim 13, further comprising a hook attached to said second end of said first cable for selectively attaching said first cable to a vehicle to which the trailer may be hitched for towing.

23. The biased cable mechanism of claim 15, further comprising a hook attached to said second end of said second cable for selectively attaching said second cable to a vehicle to which the trailer may be hitched for towing.

* * * * *